United States Patent [19]

Nathenson et al.

[11] 4,431,932
[45] Feb. 14, 1984

[54] ADVANCED SPIRAL PANCAKE ARMATURE FOR A DYNAMOELECTRIC MACHINE

[75] Inventors: Richard D. Nathenson, Pittsburgh; Mukund R. Patel, Monroeville, both of Pa.

[73] Assignee: Electric Power Research Institute, Inc., Palo Alto, Calif.

[21] Appl. No.: 419,372

[22] Filed: Sep. 17, 1982

[51] Int. Cl.³ .............................................. H02K 9/00
[52] U.S. Cl. .................................... 310/208; 310/43; 310/54; 310/206
[58] Field of Search ...................... 310/42, 43, 54, 64, 310/198, 206, 266, 268, 208

[56] References Cited

U.S. PATENT DOCUMENTS

| | | | |
|---|---|---|---|
| 4,019,075 | 4/1977 | Kagami | 310/206 |
| 4,151,433 | 4/1979 | Flick | 310/54 |
| 4,164,672 | 8/1979 | Flick | 310/54 |
| 4,271,370 | 6/1981 | DiMeo | 310/266 |
| 4,292,558 | 9/1981 | Flick et al. | 310/194 |

FOREIGN PATENT DOCUMENTS 329670  5/1976  Austria .

OTHER PUBLICATIONS

Aichholzer, Eingelangt/"New Solutions for the Design of Large Turbo Generators up to 2 GVA, 60 KV"/9-2-5-74.

Primary Examiner—J. D. Miller
Assistant Examiner—D. L. Rebsch
Attorney, Agent, or Firm—William D. Lanyi

[57] ABSTRACT

A spiral pancake armature winding assembly for a superconducting generator is provided which incorporates inner and outer support tubes along with a middle support tube disposed within the pancake coil assembly itself. A plurality of filler pieces, each of which is shaped to fit within a generally rectangular opening of each pancake coil, are rigidly attached to each other in such a way so as to form a middle support tube which provides mechanical support to the pancake coils and prevents relative circumferential movement between adjacent pancake coils. The inner and outer support tubes are shaped to fit within the bore of the spiral pancake armature winding and around its outer periphery. A plurality of spiral wedges, or ramps, are used in conjunction with the inner and outer support tubes in order to provide an improved fit between the support tubes and the spiral pancake armature winding. An assembly method is described which progresses from a configuration in which the plurality of pancake coils are loosely arranged in a pinwheel association to the compact spiral pancake armature winding in which each of the plurality of pancake coils is in contact with other adjacent pancake coils.

18 Claims, 15 Drawing Figures

ADVANCED SPIRAL PANCAKE ARMATURE FOR A DYNAMOELECTRIC MACHINE

BACKGROUND OF THE INVENTION

The present invention relates generally to the armature assembly of a dynamoelectric machine and, more specifically, to the spiral pancake armature winding of a superconducting generator.

Superconducting generators generally utilize a supercooled rotor, which comprises superconducting field windings, and a stator which incorporates an air gap armature winding. Although air gap armature windings have been proposed for stators of synchronous machines with non-superconducting field windings made of conventional copper, no applications of this type are presently known. Air gap windings for superconducting generators, however, have been developed and are known to those skilled in the art.

The particular type of air gap armature winding for which the present invention is particularly applicable is a spiral pancake winding assembly. The basic configuration of spiral pancake armature windings is described in Austrian Patent No. OE329670 issued to Aichholzer on May 25, 1976. Significant detailed improvements on the spiral pancake winding assembly are described in U.S. Pat. No. 4,151,433 issued to Flick on Apr. 24, 1979 and U.S. Pat. No. 4,164,672 issued to Flick on Aug. 14, 1979. A support structure for dynamoelectric machines having stators which utilize spiral pancake windings is disclosed in U.S. Pat. No. 4,292,558 issued to Flick et al. on Sept. 29, 1981. Pancake armature coils are also discussed in Section 3 of an article entitled "New Solutions for the Design of Large Turbo Generators up to 2 GVA, 60 KV" by Aichholzer, Eingelangt, 9-25-74.

Specific insulation and support mechanisms for use in conjunction with spiral pancake stator coils are disclosed in Patent Application Ser. No. 226,335 filed by Nathenson on Jan. 19, 1981 and assigned to the assignee of the present invention. An alternative support and insulation system for use with spiral pancake coils is discussed in U.S. Patent Application Ser. No. 324,295 filed by Flick et al. on Nov. 23, 1981 and assigned to the assignee of the present invention.

SUMMARY OF THE INVENTION

The present invention relates generally to the stator of a dynamoelectric machine and more particularly to the spiral pancake armature winding of a superconducting generator. It is specifically related to the construction of a spiral pancake armature winding which facilitates its assembly and provides a significantly improved structural support mechanism.

A spiral pancake armature winding made in accordance with the present invention comprises a plurality of spiral pancake coils, each of which comprises a conductor which is wound in a spiral pattern around a generally rectangular opening. Each pancake coil is additionally formed into the shape of an arcuate section of a spiral along a longitudinal axis. Each of the pancake coils is shaped to be associated with other similarly made pancake coils to form an overlapping association of pancake coils which is generally cylindrical and has a central bore extending therethrough. The present invention further comprises a plurality of filler pieces, each of which is shaped to fit within the rectangular opening of each of the pancake coils. These filler pieces not only provide support which prevents the helical winding of its associated pancake coil from collapsing inward toward the rectangular opening but, also permits the construction of a generally rigid middle support tube within the armature winding by attaching each of the filler pieces to at least two other adjoining filler pieces. When the filler pieces are attached to each other in the manner described above, the resulting structure is a generally rigid support tube centrally located within the body of the armature winding itself.

In order to assemble the armature winding together with its middle support tube, the plurality of pancake coils can be associated in a pinwheel configuration with each of the coils being spaced apart from its adjacent coils. It is advantageous that all of the pancake coils are simultaneously and gradually brought together in such a way that their large curved surfaces approach each other in an essentially parallel orientation with a progressively decreasing clearance until contact is achieved between the adjacent surfaces of adjacent pancake coils. The original pinwheel configuration, described above, begins with the coils standing on edge on a horizontal planar reference surface such as a shop floor. This initial pinwheel configuration incorporates relatively large clearances between adjacent surfaces of adjacent coils and positions the inner edges of the coils on an inner circle and the outer edges of the coils on another larger circle. From this initial pinwheel configuration, the coils are simultaneously moved with their inner edges moving radially outward and their outer edges moving radially inward. As this motion is continued, each pancake coil gradually moves into the desired position and the adjacent surfaces of adjacent coils come into contact with each other. The movement described above may be accomplished by rotating each of the pancake coils about its individual longitudinal axis.

Prior to converging the original pinwheel configuration into the final spiral pancake assembly, the plurality of filler pieces discussed above are disposed in an overlapping cylindrical association. This cylindrical association, which acts as a middle support tube for the spiral pancake assembly, is constructed so that it intersects each of the plurality of individual pancake coils while they are arranged in the pinwheel configuration. With the pancake coils remaining in the pinwheel configuration, the filler pieces are attached to each other to form the cylindrical middle support tube member.

After the filler pieces are rigidly combined to form the cylindrical middle support tube, the pancake coils can be gradually moved from the pinwheel configuration to the spiral pancake winding configuration as described above. As each of the pancake coils moves into its final position, it is fitted over its associated filler piece which is shaped to fit into the rectangular opening of the pancake coil. When all of the plurality of pancake coils is associated with a preselected one of the plurality of filler pieces, the pancake coils and filler pieces form a generally rigid spiral pancake armature assembly with the filler pieces being associated to form a generally rigid middle support tube on which the pancake coils are assembled.

The armature assembly described above is further supported by the insertion of a generally cylindrical inner support tube into its central bore. An outer support tube is disposed about the outer surface of the spiral pancake armature winding. Thus, it should be understood that the spiral pancake armature winding described herein comprises an inner, outer and middle support tube.

In order to provide a better fit between the spiral pancake armature winding and its inner and outer support tubes, a plurality of spiral ramps, or wedges, are provided. Each of these spiral wedges is shaped to fit in the gaps which are formed between the generally cylindrical inner and outer support tubes and the inner and outer surfaces of the spiral pancake armature winding. These separate spiral wedges serve the additional purpose of permitting a looser fit between the various stator components during assembly, with any existing gaps between the major components being filled by the insertion of the spiral wedges between the spiral pancake armature winding and the outer support tube and between the spiral pancake armature winding and the inner support tube. The spiral wedges, or ramps, can be bonded to their respective support tubes. It should be understood that, due to the shape of the spiral wedges and the inner and outer surfaces of the spiral pancake armature winding, a counter-rotation of the inner and outer support tubes, in conjunction with the spiral wedges, causes the spiral pancake armature winding to experience a radially compressive force which provides for a more rigid containment and support of the winding assembly.

It should be apparent that the present invention provides a spiral pancake armature winding for use in a superconducting generator which facilitates its assembly and incorporates an inner, outer and middle support tube which substantially increase the available support and containment of the spiral pancake armature winding.

DESCRIPTION OF THE PREFERRED EMBODIMENT

The present invention relates generally to the stator member of a dynamoelectric machine and particularly to the spiral pancake armature assembly of the stator of a superconducting generator.

Figure 1:
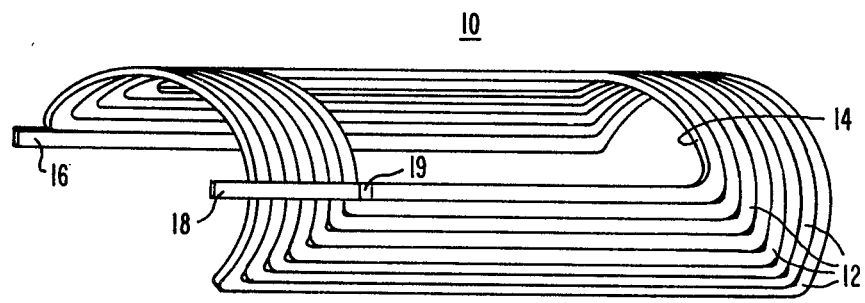
FIG. 1 illustrates a single pancake coil.

FIG. 1 illustrates a pancake coil 10. The pancake coil 10 is constructed of a conductor 12 spirally wound around a central rectangular opening 14. Each pancake coil 10 has two leads 16 and 18, which provide electrical communication between the pancake coil 10 and other pancake coils of the armature winding or between the pancake coil 10 and the main leads of the generator. The lead 18 from the inner turn of the spiral winding comprises a raised portion 19 which permits it passage over the other, outwardly positioned, turns. The pancake coil 10 is formed into an arcuate shape about a longitudinal axis as shown. It should be understood that the arcuate shape is not circular but, instead, is an arcuate section of a spiral.

Figure 2:
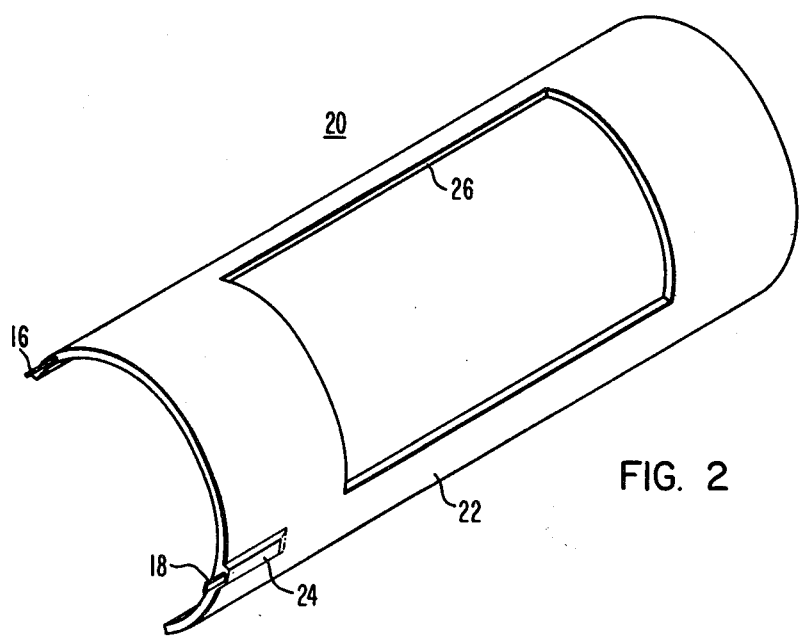
FIG. 2 shows a single pancake coil surrounded by an insulative coating.

FIG. 2 shows an exemplary insulated pancake coil 20. It should be understood that the insulated pancake coil 20 comprises the pancake coil 10 of FIG. 1 with an appropriate electrically insulative covering 22. Also shown in FIG. 2 is a raised portion 24 of the insulative covering which permits the overlapping portion (reference numeral 19 of FIG. 1) of the pancake coil to be electrically insulated from external conductive members. The leads 16 and 18, are also shown extending from the insulated pancake coil 20. The generally rectangular opening 26 can be seen in FIG. 2 to be equivalent in its spacial relationship to the leads, 16 and 18, as the opening 14 illustrated in FIG. 1. It should be understood that the insulative covering of the insulated pancake coil 20 can be any suitable material which has properties sufficient to protect the pancake coil from electrical communication with external conductive members. In order to simplify the description of the present invention, the term "pancake coil" will be used henceforth to describe the insulated pancake coil 20 shown in FIG. 2.

Figure 3:
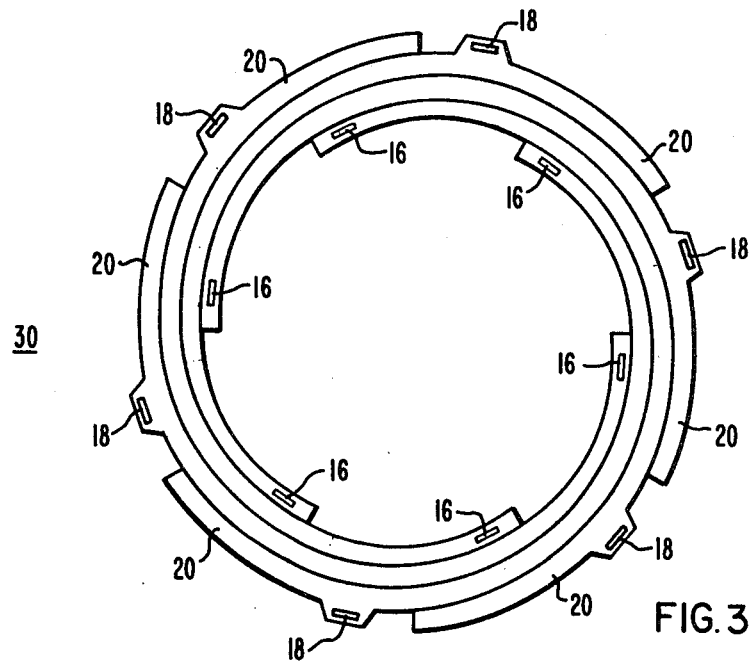
FIG. 3 shows an end view of a plurality of pancake coils arranged to form a spiral pancake armature winding.

FIG. 3 shows a plurality of pancake coils 20 arranged in an overlapping association to form a spiral pancake armature winding 30. This end view of the spiral pancake armature winding 30 shows the leads 16 and 18, of each of the pancake coils 20. In FIG. 3, six pancake coils 20 are shown arranged in an overlapping spiral association, but it should be understood that alternate numbers of pancake coils 20 can be similarly arranged to form a spiral pancake armature winding within the scope of the present invention.

Figure 4:
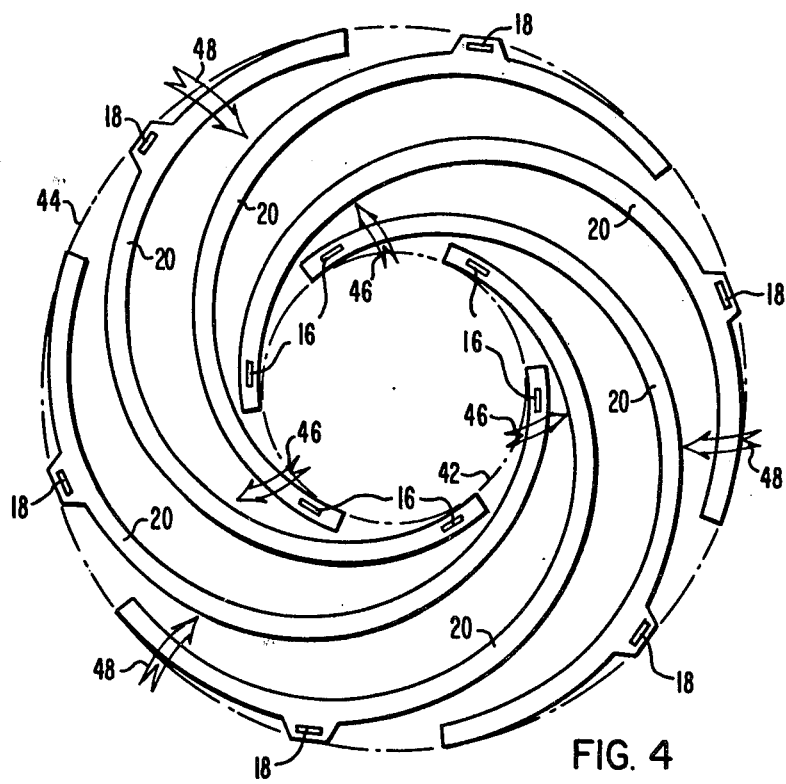
FIG. 4 illustrates a plurality of individual pancake coils arranged in a pinwheel configuration during an intermediate step of their assembly into a spiral pancake armature winding.

FIG. 4 illustrates a preliminary assembly step in the manufacture of the spiral pancake armature winding (reference numeral 30 in FIG. 3). As can be seen in FIG. 4, the plurality of pancake coils 20 are arranged in a pinwheel configuration with adjacent surfaces of adjacent pancake coils 20 spaced apart from each other. The pancake coils 20 are positioned in such a way that their inner edges lie on an inner circle 42 and their outer edges lie on an outer circle 44. For ease of manufacture, it is recommended that the pancake coils 20 be arranged in the pinwheel configuration as shown with the inner 42 and outer 44 circles describing cylindrical surfaces which are coaxial and concentric with each other and whose central axis is vertical, or perpendicular to the shop floor. It should be noted that this assembly procedure permits the spiral pancake coil to be brought into this pinwheel configuration with conventional handling facilities due to the provision of large initial spatial clearances between adjacent pancake coils. The pinwheel association shown in FIG. 4, therefore, represents a top view of the preliminary pinwheel configuration of pancake coils 20. The inner edges of the pancake coils 20, which lie on the circle 42, are then gradually moved outward as shown by arrows 46. Simultaneously, the outer edges of the pancake coils 20 are gradually moved inward in the direction shown by arrows 48. As the pancake coils 20 are gradually rotated about their individual longitudinal axes, adjacent surfaces of adjacent pancake coils 20 slowly approach each other. As this procedure is continued, adjacent surfaces of adjacent pancake coils 20 eventually come into contact with each other to form the spiral pancake armature winding 30 which is illustrated in FIG. 3. It should be apparent that this procedure provides for the assembly of a plurality of pancake coils into a tight-fitting configuration without the need for axially sliding one pancake coil over its adjacent coils. Therefore, it is an advantageous alternative to a conventional technique of sliding each pancake coil axially into its final position in the assembly which, due to tight tolerances of pancake coil dimensions could result in significant abrasive damage to adjacent coils.

Figure 5:
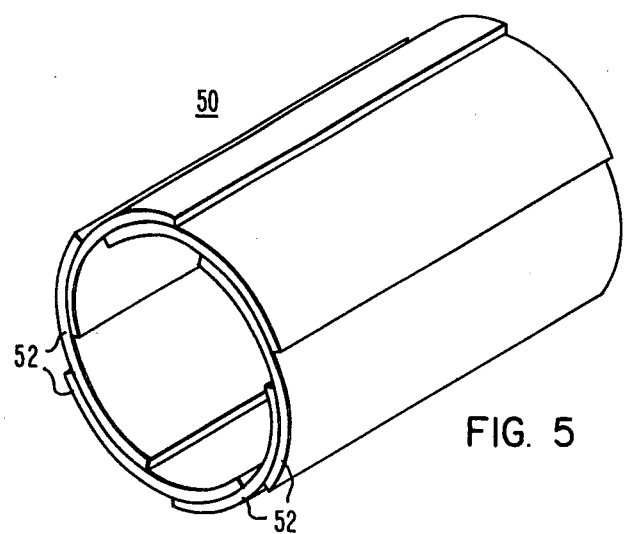
FIG. 5 shows a plurality of filler pieces attached to each other and configured in a generally cylindrical association to form a middle support tube.

Referring once again to FIG. 2, the pancake coil 20 is shown having a generally rectangular opening 26 around which the coil's conductor (reference numeral 12 of FIG. 1) is spirally wound with leads 16 and 18, being at the opposite termini of the conductor. A spiral pancake armature winding made in accordance with the present invention utilizes individual filler pieces, each of which is shaped to fit within this opening 26. FIG. 5 illustrates a plurality of these filler pieces 52 arranged in an overlapping association to form a generally cylindrical middle support tube 50 with each of the filler pieces 52 being rigidly attached to at least two other filler pieces 52. The method of rigidly attaching the filler pieces 52 together will be described in detail below but, it should be understood that any suitable attachment means should be considered within the scope of the present invention.

Figure 6:
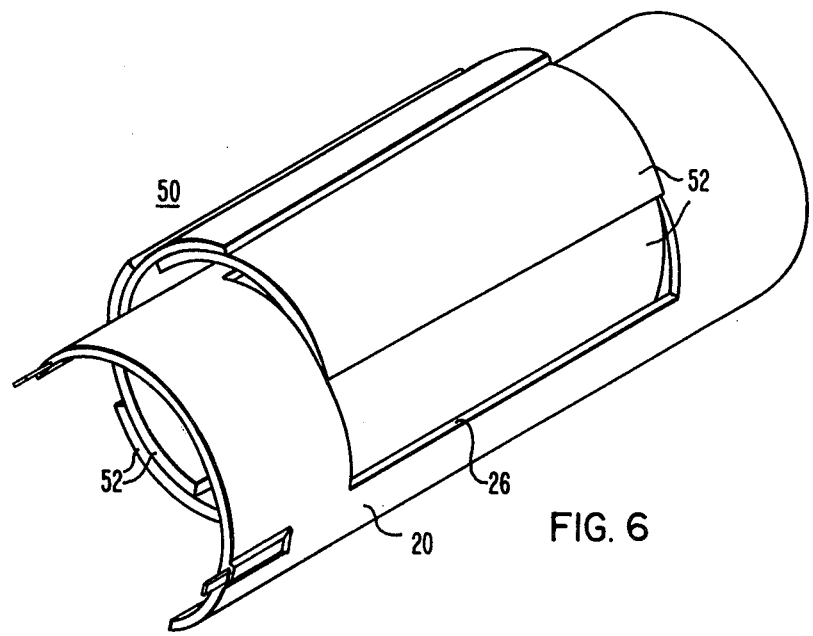
FIG. 6 illustrates the middle support tube shown in FIG. 5 associated with an exemplary one of a plurality of pancake coils.

FIG. 6 illustrates the middle support tube 50 with one exemplary pancake coil 20 assembled in captive association therewith. Only one pancake coil 20 is shown in FIG. 6 for purposes of clarity, but it should be understood that all of the plurality of pancake coils 20 of the present invention would be similarly associated with the middle support tube 50. When the filler pieces 52 are associated with each other and attached together to form the middle support tube 50 while extending through the openings 26 of a plurality of pancake coils, the pancake coils 20 are configured in the pinwheel association illustrated in FIG. 4. Thus, the rigid attachment of the filler pieces 52 to each other effectively captivates the plurality of pancake coils 20, but permits the limited rotation of each of the pancake coils 20 about its individual longitudinal axis. It should be understood that, although the pancake coil 20 illustrated in FIG. 6 does not show the leads (reference numerals 16 and 18 in FIGS. 1 and 2), this omission is purposely done in order to simplify FIG. 6 which is specifically intended to demonstrate the relative geometric positions of the filler pieces 52 and the pancake coils 20. It should further be understood that the pancake coil 20 which is shown in FIG. 6 is actually identical in every respect to the pancake coil 20 shown in FIG. 2. This simplification will also be followed in FIGS. 7 and 8.

Figure 7:
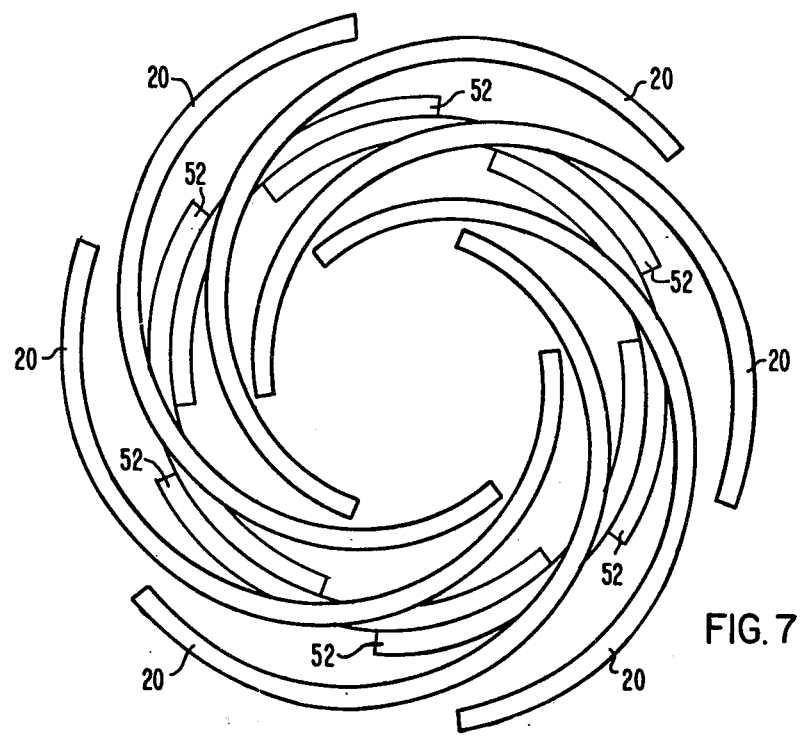
FIG. 7 shows an end view of the middle support tube shown of FIG. 5 associated with a plurality of pancake coils arranged in a pinwheel configuration as illustrated in FIG. 4.

FIG. 7 shows a top view of the pinwheel configuration of a plurality of pancake coils 20 in association with a plurality of filler pieces 52 which are rigidly attached together to form the middle support tube 50. The middle support tube 50 is shown extending through all of the openings (reference numeral 26 of FIG. 2 which is not shown in FIG. 7) of the pancake coils 20 which are arranged in the pinwheel association described above. Each of the filler pieces 52 is shaped to fit within the generally rectangular opening of a preselected one of the plurality of pancake coils 20. Therefore, it should be understood that FIG. 7 illustrates a preliminary step in the assembly of a spiral pancake armature winding made in accordance with the present invention. As shown in FIG. 7, the pancake coils 20 are arranged in their pinwheel configuration with the middle support tube 50 extending through the openings of each of the pancake coils. The pancake coils 20, although effectively captivated by the middle support tube 50, are free to rotate about their individual longitudinal axes. As the inner edges of the pancake coils 20 are moved radially outward and the outer edges of the pancake coils 20 are moved radially inward, each of the pancake coils 20 slowly rotates about its individual longitudinal axis and adjacent surfaces of adjacent pancake coils simultaneously approach each other until eventually these adjacent surfaces of adjacent coils come into direct physical contact with each other. As adjacent pancake coils 20 come into contact with each other, their individual openings (reference numeral 26 in FIG. 2) each fit over a preselected associated filler piece 52.

Figure 8:
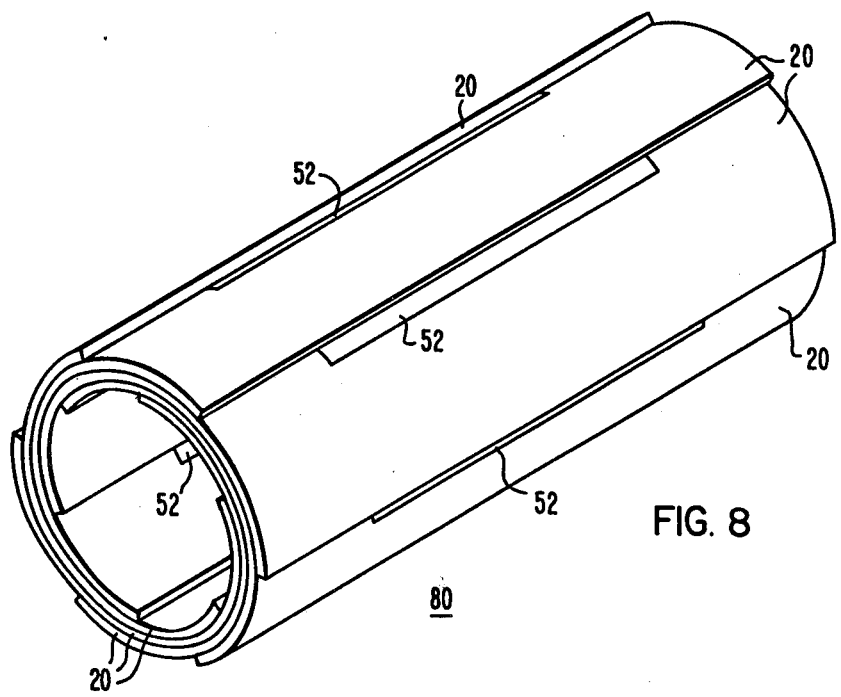
FIG. 8 illustrates a plurality of pancake coils and their associated filler pieces arranged in a tightly assembled overlapping spiral pancake armature winding.

FIG. 8 illustrates a spiral pancake armature winding 80 which results from the procedure described above in conjunction with FIG. 7. Each of the pancake coils 20 is arranged in the overlapping spiral association shown in FIG. 8 with the filler pieces 52 also aranged in an overlapping spiral configuration. As can be seen in FIG. 8, a specific advantage of the present invention is that the spiral pancake armature winding 80 is supported by a middle support tube which comprises the plurality of filler pieces 52. These filler pieces 52, when rigidly attached to each other to form a middle support tube (reference numeral 50 in FIGS. 5, 6 and 7), form an internal support member which not only provides mechanical support for the spiral pancake armature winding 80, but also serves to prevent circumferential motion of the pancake coils 20 with respect to one another.

Figure 9:
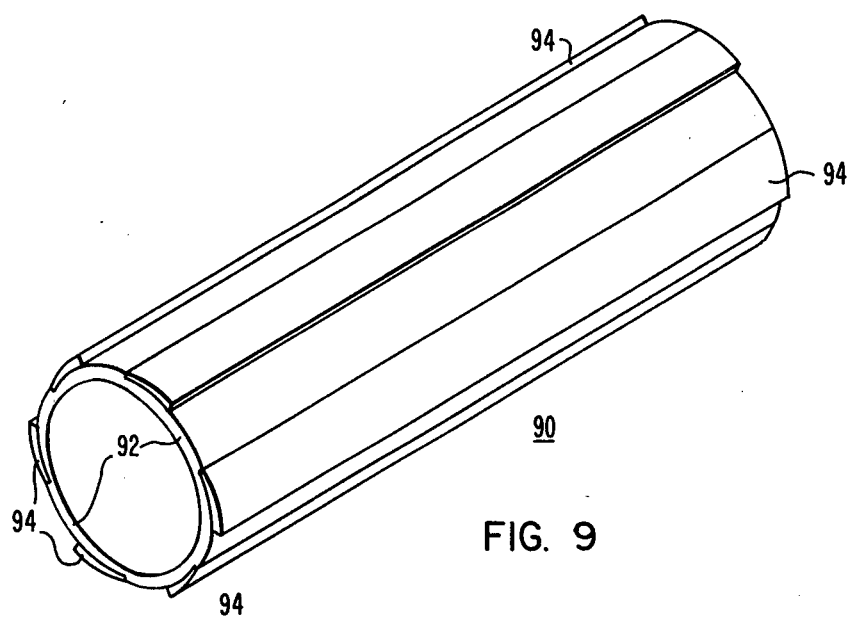
FIG. 9 illustrates an inner support tube of the present invention.

FIG. 9 shows an inner support tube 90 which is used in conjunction with the spiral pancake armature winding 80 illustrated in FIG. 8. The inner support tube 90 is shown in FIG. 9 as comprising a generally cylindrical member 92 with a plurality of spiral wedges 94 disposed about its outer surface. These spiral wedges 94, alternatively referred to herein as spiral ramps 94, serve the purpose of conforming the outer surface of the inner support tube 90 to the inner surface of the spiral pancake armature winding 80 which is illustrated in FIG. 8. Although both of these two surfaces contain a plurality of discontinuities, proper dimensional selection of the spiral wedges 94 will result in the inner support tube 90 fitting properly within the inner bore of the spiral pancake armature winding 80 shown in FIG. 8.

Figure 10:
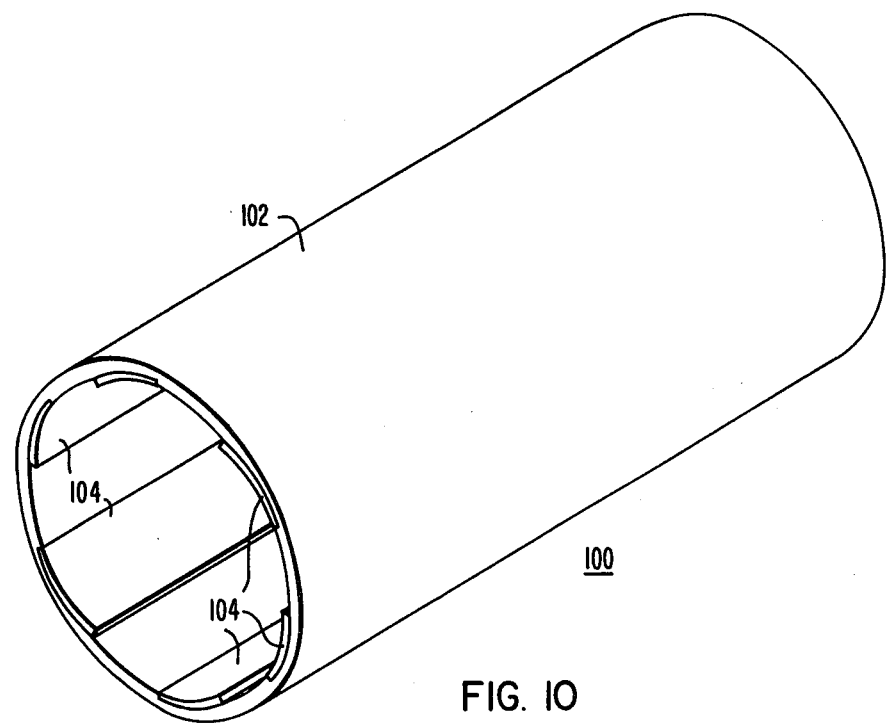
FIG. 10 illustrates an outer support tube of the present invention.

FIG. 10 shows an outer support tube 100 which comprises a generally cylindrical member 102 and a plurality of spiral wedges 104. The spiral wedges 104, which are alternatively referred to herein as spiral ramps 104, are used in conjunction with the inner surface of the tubular member 102 to conform to the geometric shape of the outer surface of the spiral pancake armature winding (reference numeral 80 of FIG. 8). Thus, although the inner surface of the outer support tube 100 and the outer surface of the spiral pancake armature winding (reference numeral 80 in FIG. 8) both contain a plurality of discontinuities, their respective shapes permit the outer support tube 100 to be placed around the spiral pancake armature winding (reference numeral 80 in FIG. 8).

Figure 11:
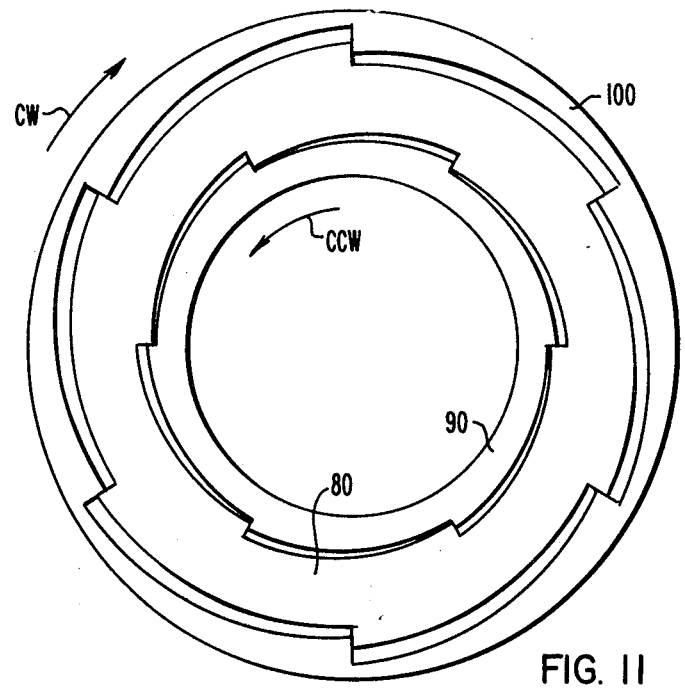
FIG. 11 depicts the inner and outer support tubes of FIGS. 9 and 10 with the spiral pancake armature winding assembly of FIG. 8 disposed therebetween.

Referring to FIGS. 8, 9 and 10, it should be understood that the inner support tube 90 and the outer support tube 100 are shaped to fit within the bore of the spiral pancake armature winding 80 and around its outer surface, respectively. It should also be understood that the spiral wedges, 94 and 104, can be rigidly attached to the respective support tubes, either prior to assembly with the spiral pancake armature winding 80 or afterwards. However, it should also be understood that by assembling the inner 90 and outer 100 support tubes around the spiral pancake armature winding 80, as shown in FIG. 11, without the spiral wedges 94 and 104, in place, the fit between these components is much looser and this assembly operation is greatly facilitated. These spiral wedges 94 and 104, can then be axially inserted after the major support components, 90 and 100 are rotated in opposing directions as described below. Depending on the manufacturing tolerance of the individual components of the present invention, it has been found to be advantageous to insert the spiral wedges after the assembly of the inner and outer support tubes around the spiral pancake armature winding. This insertion is done in an axial direction relative to the inner support tube 90, outer support tube 100 and the spiral pancake armature winding 80. When assembled together, it should be understood that these three major components are associated in coaxial and concentric relation with each other.

FIG. 11 illustrates a simplified view of the three major components of the present invention. The outer support tube 100 is disposed around the spiral pancake armature winding 80 and the inner support tube 90 is disposed within its central bore. Because of the relative geometric shapes of these three major components, it should be apparent that when the inner support tube 90 is rotated in a counterclockwise direction (shown by arrow CCW) and the outer support tube 100 is rotated in a clockwise direction (shown by arrow CW) the spiral pancake armature winding 80 is radially compressed between these two support tubes. When these three major components of the present invention are rigidly attached together following this counter rotation of the inner 90 and outer 100 support tubes, significant additional support is provided to the spiral pancake armature winding 80. Although not illustrated in FIG. 11, it should be clearly understood that within the spiral pancake armature winding 80 itself is the middle support tube (reference numeral 50 of FIGS. 5, 6 and 7). This middle support tube provides internal support of the pancake coils and prevents relative circumferential motion of these coils.

The collapsing pinwheel assembly technique described has the significant advantage of permitting each individual pancake coil to be sized for a tight fit with the other pancake coils while avoiding damage to the coils during assembly. If an axial assembly method were utilized, each pancake coil would have to slide over adjacent coils and potential damage could occur.

Figure 12:
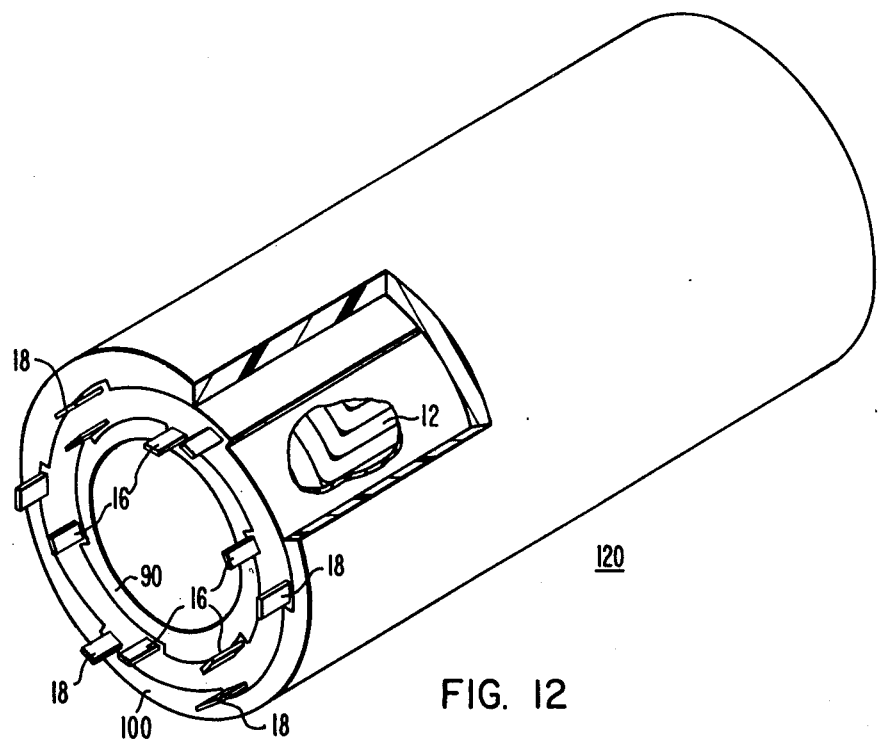
FIG. 12 shows a sectioned view of a superconducting generator stator made in accordance with the present invention.

FIG. 12 illustrates a section view of a superconducting stator made in accordance with the present invention. Each of the individual pancake coils which combine to form the spiral pancake armature winding 80 comprises a conductor 12 which is spirally wound about a central rectangular opening (not shown in FIG. 12). Each pancake coil also comprises a pair of leads, 16 and 18, which permits external electrical connections to be made. The complete spiral pancake armature winding 80 is supported on its inner surface by the inner support tube 90 and on its outer surface by the outer support tube 100. The inner cylindrical surface of the inner support tube 90 is shaped to receive a superconducting rotor (not shown in FIG. 12) which is disposed within the bore of the superconducting stator 120 in coaxial and concentric relation therewith.

It should be understood that the filler pieces (reference numeral 52 of FIGS. 5, 6, 7 and 8), the inner support tube (reference numeral 90 of FIGS. 9, 11 and 12), the outer support tube (reference numeral 100 of FIGS. 10, 11 and 12) and the spiral wedges (reference numerals 94 and 104 of FIGS. 9 and 10) are all made of a non-conductive material. Although the present invention anticipates the specific use of a glass-epoxy resin material, other suitable materials are to be considered within its scope.

Figure 13:
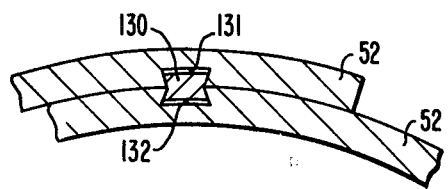
FIG. 13 illustrates two filler pieces fastened together with an axially-driven key.
Figure 14:
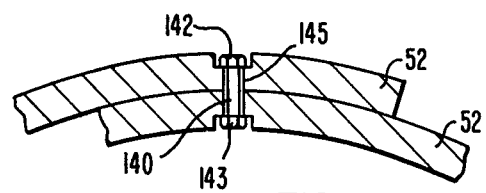
FIG. 14 illustrates two filler pieces fastened together with a threaded device.

The attachment of the filler pieces (reference numeral 52 of FIGS. 5, 6, 7 and 8) has been discussed generally above. FIGS. 13 and 14 illustrate two specific methods of attaching the filler pieces 52 together. FIG. 13 shows two filler pieces 52 being connected by an axially-driven key 130 which is disposed in a keyway which is created by aligning two channels, 131 and 132, which are formed in the two filler pieces 52. FIG. 14 shows an alternate method of attaching the filler pieces 52 together. A threaded stud 140, in conjunction with a pair of nuts, 142 and 143, are disposed through a hole 145 which passes through two adjacent filler pieces 52. Of course, it should be understood that other threaded means, such as a bolt and nut combination, are also possible. The means for attaching the filler pieces 52 together, as illustrated in FIGS. 13 and 14 or otherwise, should utilize non-conductive components. It should also be understood that the adjacent filler pieces 52 could be bonded together with a synthetic resin compound.

Figure 15:
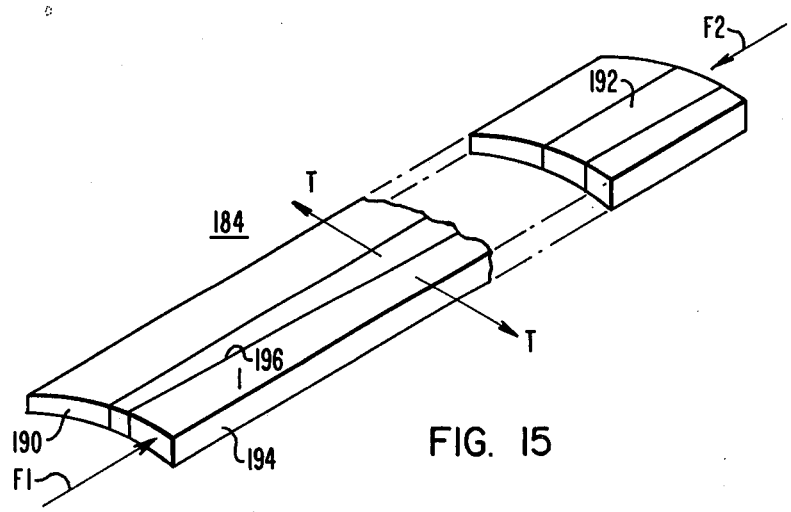
FIG. 15 illustrates a composite spiral wedge.

The spiral wedges, 94 and 104, can be made in such a way so as to permit an axially-directed force, after their insertion into the stator assembly, to be translated into a tangential force which has a beneficial effect. FIG. 15 illustrates a wedge design which accomplishes this force direction translation. This composite spiral wedge 184, which could serve the functions of either type of spiral wedge (reference numerals 94 and 104 described above in conjunction with FIGS. 9 and 10) described above, comprises a first portion 190 which is circumferentially driven between radially adjacent portions of the armature assembly (shown in FIG. 11) by the combined action of second 192 and third 194 portions of the composite spiral wedge 184. As can be seen in FIG. 15, an axial force F1 directed against the third portion 194 and an opposing axial force F2 directed against the second portion 192 cause these two portions to slide along their common interface plane 196 and result in a tangential force to be exerted in the directions shown by arrows T. This tangential force has the beneficial effect of driving the first portion 190 of the composite wedge 184 more firmly against the adjacent radial surfaces of its adjacent armature components which comprise the spiral pancake armature winding (reference numeral 80 of FIG. 11) and either the inner or outer support tubes (reference numerals 90 or 100, respectively, of FIG. 11).

It should be apparent to one skilled in the art that the present invention provides a stator for a superconducting generator which incorporates a spiral pancake armature winding assembly which facilitates its manufacture and comprises an improved mechanical support system. It should further be apparent that the spiral pancake armature winding of the present invention is mechanically supported on its inner cylindrical surface, its outer cylindrical surface and within its pancake coil structure itself.

It should be understood that although the present invention has been described in considerable detail and with particularity in both the figures and discussion, it should not be considered to be so limited. It should further be understood that alternative embodiments should be considered within the scope of the present invention.

What we claim is:

1. A dynamoelectric machine comprising:
   a plurality of spiral pancake coils, each of said coils being shaped to fit with the other of said plurality of coils in an overlapping association, said overlapping association being generally cylindrical with a central bore therethrough, each of said coils being formed by winding a conductor around a generally rectangular opening;
   a plurality of middle support members, each of said middle support members being shaped to fit within said opening of a preselected one of said plurality of coils;
   an inner support member shaped to fit within said central bore;
   an outer support member shaped to fit around said overlapping association of coils; and
   means for insulating each of said plurality of coils from electrical communication with others of said plurality of coils.

2. The machine of claim 1, wherein:
   each of said plurality of middle support members is rigidly attached to at least two others of said plurality of middle support members, said plurality of middle support members being associated to form a generally cylindrical middle support tube.

3. The machine of claim 1, further comprising:
   a first plurality of spiral ramps shaped to fit between said inner support member and said overlapping association of coils.

4. The machine of claim 1, further comprising:
   a second plurality of spiral ramps shaped to fit between said outer support member and said overlapping association of coils.

5. The machine of claim 1, wherein:
   said inner support member is made of an electrically insulative material.

6. The machine of claim 1, wherein:
   said outer support member is made of an electrically insulative material.

7. The machine of claim 1, wherein:
   each of said middle support members is made of an electrically insulative material.

8. A superconducting generator, comprising:
   a plurality of pancake coils, each of said coils having a conductor wound in a spiral pattern around a generally rectangular central opening, each of said coils being formed into a generally arcuate shape, each of said plurality of coils being associated in an overlapping relation with others of said plurality of coils to form a generally cylindrical stator winding, said stator winding having a generally cylindrical bore therethrough, each of said plurality of coils being insulated from electrical contact with others of said plurality of coils;
   a plurality of filler pieces, each of said filler pieces being shaped to fit within said opening of a preselected one of said plurality of coils;
   an inner support tube shaped to fit within said cylindrical bore;
   an outer support tube shaped to fit around said stator winding;
   a first plurality of spiral wedges shaped to fit between said inner support tube and said stator winding; and
   a second plurality of spiral wedges shaped to fit between said outer support tube and said stator winding.

9. The generator of claim 8, further comprising:
   a supercooled rotor disposed in concentric and coaxial relation with said stator winding within a central bore of said inner support tube.

10. The generator of claim 8, wherein:
    said inner support tube, said outer support tube and said plurality of filler pieces are made of an electrically insulative material.

11. The generator of claim 8, wherein:
    said plurality of filler pieces are rigidly fastened together to form a middle support member.

12. A method for making a stator of a dynamoelectric machine, comprising:
    providing a plurality of spirally wound pancake coils, each of said coils having a central opening which is generally rectangular, each of said coils having a generally arcuate shape;
    providing a plurality of filler pieces, each of said plurality of filler pieces being generally rectangular and shaped to fit within said opening of a preselected one of said plurality of coils;
    arranging said plurality of coils in a pinwheel association with space between adjacent surfaces of adjacent ones of said plurality of coils;
    disposing said plurality of filler pieces in a generally cylindrical association to form a middle support tube, said middle support being disposed through said openings of said plurality of coils;
    rigidly attaching each of said plurality of filler pieces to at least two others of said plurality of filler pieces;
    rotating each of said plurality of coils about a longitudinal axis so that the adjacent surfaces of said plurality of adjacent coils are moved toward each other and said plurality of coils are associated in an overlapping cylindrical association with a central bore therethrough; and
    inserting each of said plurality of filler pieces into said opening of a preselected one of said plurality of coils.

13. The method of claim 12, further comprising:

disposing an inner support tube within said central bore.

14. The method of claim 12, further comprising:
disposing an outer support tube around said cylindrical association of coils.

15. The method of claim 13, further comprising:
disposing a first plurality of spiral wedges between said inner support tube and said cylindrical association of coils.

16. The method of claim 14, further comprising:
disposing a second plurality of spiral wedges between said outer support tube and said cylindrical association of coils.

17. The method of claim 15, further comprising:
rotating said inner support tube and said cylindrical association of coils in opposite circumferential directions prior to disposing said first plurality of spiral wedges.

18. The method of claim 16, further comprising:
rotating said outer support tube and said cylindrical association of coils in opposite circumferential directions prior to disposing said second plurality of spiral wedges.

* * * * *